(12) United States Patent
Garcia Nieto et al.

(10) Patent No.: US 10,239,602 B2
(45) Date of Patent: Mar. 26, 2019

(54) MULTI-SPAR TORSION BOX STRUCTURE

(71) Applicant: AIRBUS DEFENCE AND SPACE, S.A., Getafe (Madrid) (ES)

(72) Inventors: Carlos Garcia Nieto, Getafe (ES); Soledad Crespo Pena, Getafe (ES); Jesus Javier Vazquez Castro, Getafe (ES)

(73) Assignee: AIRBUS DEFENCE AND SPACE, S.A., Getafe (Madrid) (ES)

( * ) Notice: Subject to any disclaimer, the term of this patent is extended or adjusted under 35 U.S.C. 154(b) by 57 days.

(21) Appl. No.: 15/160,957

(22) Filed: May 20, 2016

(65) Prior Publication Data

US 2016/0340022 A1 Nov. 24, 2016

(30) Foreign Application Priority Data

May 22, 2015 (EP) ..................................... 15382269

(51) Int. Cl.
*B64C 3/18* (2006.01)
*B64C 5/02* (2006.01)
*B64C 3/26* (2006.01)

(52) U.S. Cl.
CPC ................ *B64C 3/185* (2013.01); *B64C 3/26* (2013.01); *B64C 5/02* (2013.01)

(58) Field of Classification Search
CPC .... B64C 1/12; B64C 3/00; B64C 3/18; B64C 3/185; B64C 3/26
See application file for complete search history.

(56) References Cited

U.S. PATENT DOCUMENTS

| 1,409,982 | A | * | 3/1922 | Walen | ........................ | B64C 3/26 244/132 |
|---|---|---|---|---|---|---|
| 1,886,708 | A | * | 11/1932 | Markey | ..................... | B64C 3/26 244/132 |
| 1,949,785 | A | * | 3/1934 | De La Cierva | ........ | B64C 27/023 416/1 |
| 2,092,079 | A | * | 9/1937 | Lee | ............................ | B64C 3/26 244/132 |
| 2,138,352 | A | * | 11/1938 | Mercier | ..................... | B64C 3/00 244/123.7 |
| 4,171,785 | A | * | 10/1979 | Isenberg | .................... | B64C 3/26 244/123.1 |

(Continued)

*Primary Examiner* — Joseph W Sanderson
(74) *Attorney, Agent, or Firm* — John S. Artz; Dickinson Wright PLLC

(57) ABSTRACT

Disclosed is a multi-spar torsion box structure comprising a plurality of spars of composite material arranged to form a multi-cell structure with two or more cells extending longitudinally along the torsion box, and upper and lower skin covers formed of composite material and joined to upper and lower surfaces of the multi-cell structure, respectively. The structure further comprises at least one belt-like reinforcing element extending around the outer perimeter of the torsion box, and fixed to the upper and lower surfaces of the multi-cell structure, and transversely arranged with respect to the longitudinal direction of the torsion box. The belt-like reinforcing element is made of a metallic or a composite material. The disclosed torsion box can advantageously be used in the manufacture of aircraft lifting surfaces, such as horizontal tailplanes (HTP) or wings.

14 Claims, 18 Drawing Sheets

(56) References Cited

U.S. PATENT DOCUMENTS

| | | | | |
|---|---|---|---|---|
| 4,565,595 A * | 1/1986 | Whitener | ............... | B29C 70/08 |
| | | | | 156/156 |
| 6,237,873 B1 * | 5/2001 | Amaoka | .................. | B64C 3/00 |
| | | | | 244/123.7 |
| 6,830,218 B2 * | 12/2004 | Kordel | ..................... | B64C 3/26 |
| | | | | 244/124 |
| 8,916,252 B2 * | 12/2014 | Hallander | .............. | B29C 70/30 |
| | | | | 428/44 |
| 2004/0124311 A1 * | 7/2004 | Kordel | ..................... | B64C 3/26 |
| | | | | 244/131 |
| 2012/0043422 A1 * | 2/2012 | Campana | ................. | B64C 1/26 |
| | | | | 244/123.1 |
| 2012/0088056 A1 * | 4/2012 | Hallander | .............. | B29C 70/30 |
| | | | | 428/54 |
| 2013/0020440 A1 * | 1/2013 | Honorato Ruiz | ........ | B64C 1/26 |
| | | | | 244/131 |
| 2013/0037655 A1 * | 2/2013 | Bradley | ................... | B64C 3/26 |
| | | | | 244/124 |
| 2016/0311051 A1 * | 10/2016 | Nordman | ................. | B64C 1/12 |

\* cited by examiner

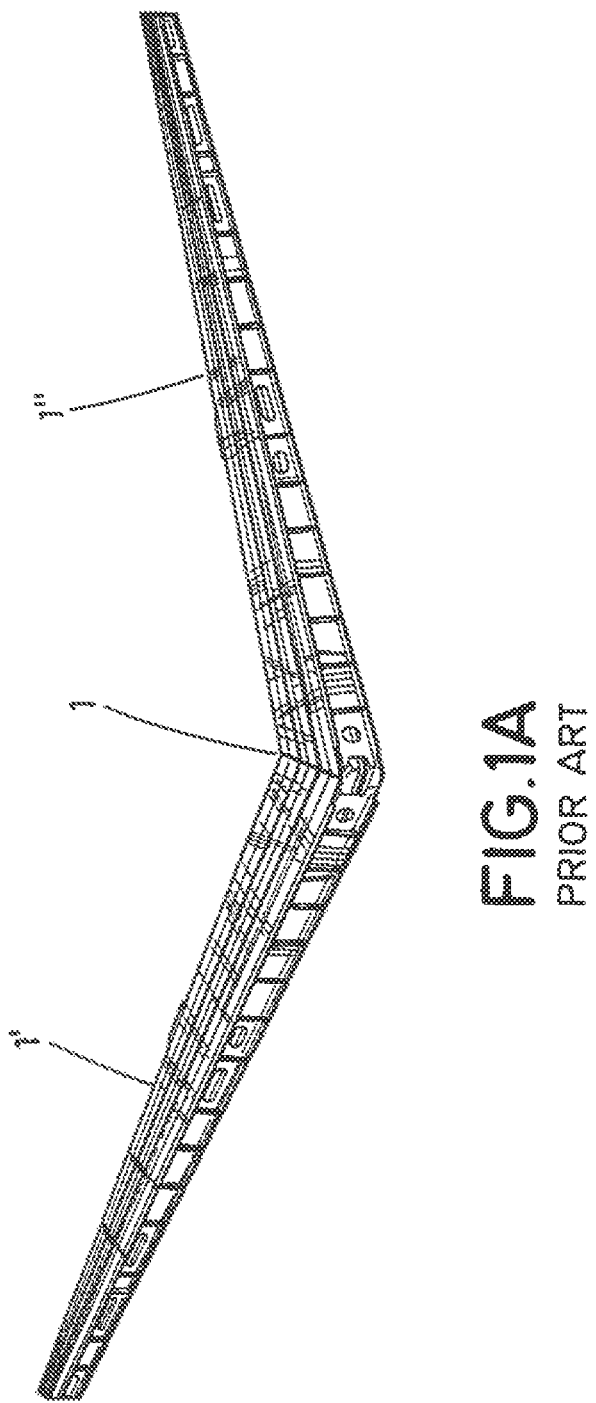

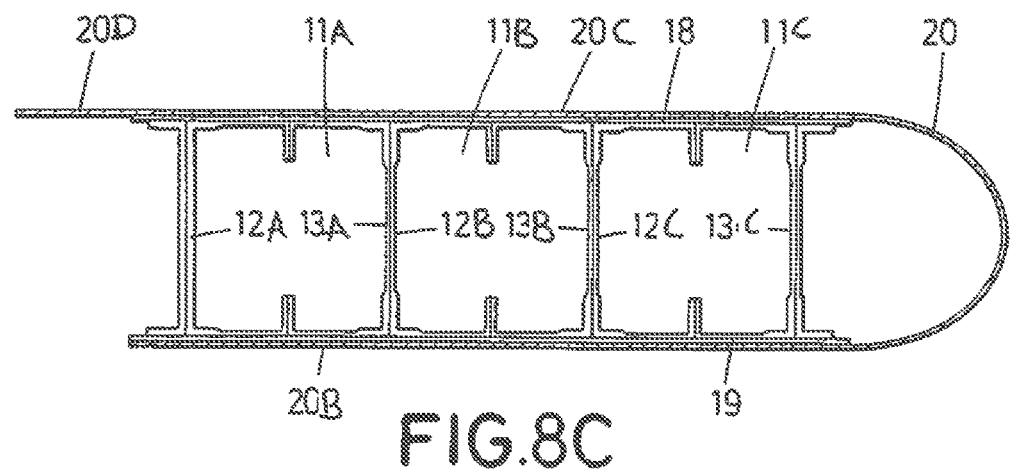
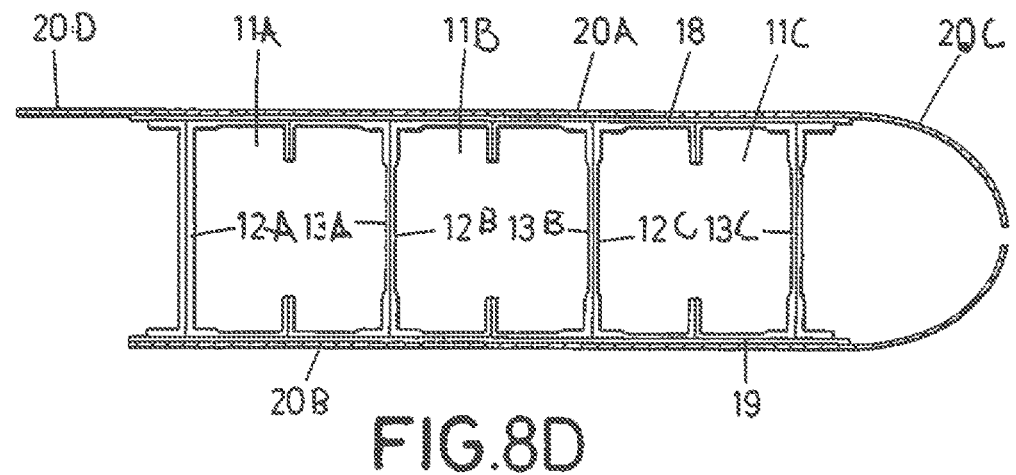

MULTI-SPAR TORSION BOX STRUCTURE

CROSS-REFERENCE TO RELATED APPLICATIONS

The present disclosure claims priority to European Application No. 15382269.7 filed on May 22, 2015, which is hereby incorporated by reference, as though set forth fully herein.

FIELD OF DISCLOSURE

The present disclosure refers in general to aircraft primary structures formed with torsion boxes, and manufactured mainly with composite materials, such as Carbon Fiber Reinforced Plastic (CFRP) materials.

An object of the present disclosure is to provide a multi-spar torsion box structure that is resistant to torsional deformations and which at the same time has a reduced weight and is simple to manufacture.

The present disclosure can advantageously be used in the manufacture of aircraft lifting surfaces, such as a horizontal tailplane (HTP) or a wing.

BACKGROUND OF THE DISCLOSURE

The most widespread structure for a torsion box is formed using front and rear spars and a plurality of ribs transversally arranged and connected to the front and rear spars, to form a box-like configuration. The torsion box also includes upper and lower skin panels internally reinforced by stringers. The main functions of the ribs are: to provide torsional rigidity, to longitudinally limit the skins and the stringers so as to discretize buckling loads, to maintain the shape of the aerodynamic surface and to support local load introductions resulting from actuator fittings, support bearings, and similar devices, which are directly secured to the front and rear spars.

Another known structural concept for a torsion box is the "multi-spar" concept, wherein the ribs are dispensed with and several spars are introduced for creating closed cells in order to replace the functions of the ribs of the previous concept. The multi-spar concept is typically used for the construction of the HTP of an aircraft, also known as a horizontal stabilizer.

FIGS. 1A and 1B show an example of a prior art multi-spar torsion box for a HTP created from a Carbon Fiber Reinforced Plastics (CFRP) material. The HTP (1) is formed by two lateral torsion boxes (1',1") (right-hand side and left-hand side torsion boxes) joined to each other at the central region of the HTP (1), and symmetrically arranged with respect to the axis of symmetry of the horizontal tailplane.

The torsion box is divided in three cells (3) by means of eight C-shaped spars grouped in pairs. The intermediate C-shaped spars (4) have, extended spar flanges and are folded at the free edges to form a stringer web (9) together with the adjacent spar. The multi-spar structure of the example also integrates the rear and front spars (7,8), and upper and lower covers (skins) (5,6). Other components of the HTP structure, such as leading and trailing edges and elevators, are assembled within the torsion box.

The European Patent Application No. EP2153979A1, describes a multi-spar torsion box with more detail.

A multi-spar torsion box has the advantage that its construction is simple, however, it is known that multi-spar torsion boxes have problems transmitting highly concentrated transverse loads, hence they may be affected by deformations caused by transverse loads. The reason for this drawback is that in a multi-spar torsion box there are no transversal ribs. Therefore, since the multi-spar concept as such does not have much torsional rigidity, sometimes, it is necessary to reinforce the structure by using additional reinforcement elements such as ribs, bars or other type of reinforcement elements, fitted at critical areas of the structure.

This is the solution proposed in the U.S. Patent Publication No. 2009/0001218A1, wherein several brackets and diagonal bars are fitted into the structure, in order to reinforce the same against torsional deformations.

However, the installation of these reinforcement elements inside the torsion box is cumbersome and time-consuming, because a multi-spar torsion box is a closed structure, hence the access to the interior is difficult. Furthermore, the installation of these reinforcement elements, increase the manufacturing and assembly costs and increases as well the weight of the structure.

SUMMARY OF THE DISCLOSURE

The present disclosure is defined in the attached independent claim and it overcomes the above-mentioned drawbacks of the prior art, by providing a multi-spar torsion box structure incorporating a reinforcing element in the form of a belt or strip which extends around the outer perimeter of a multi-spar torsion box, and that is transversely arranged with respect to an axis oriented in a longitudinal direction of the torsion box, in order to reinforce the same against torsion loads.

Therefore, an aspect of the present disclosure refers to a multi-spar torsion box structure comprising a plurality of spars formed from a composite material longitudinally arranged to configure a multi-cell structure with two or more cells extending longitudinally in the torsion box. The structure comprises at least one belt-like (or strip-like) reinforcing element extending around and following the shape of the outer perimeter of the torsion box, and fixed to upper and lower surfaces of the multi-cell structure, and which is transversely arranged with respect to an axis oriented in the longitudinal direction.

The belt-like reinforcing element is made of a metallic or a composite material, and it is dimensioned, that is, its width and thickness are calculated for each particular application, to withstand torsional loads and to prevent deformations of the torsion box.

Preferably, the belt-like reinforcing element is constructed as a closed loop, which means that it has no ends, and it extends completely around the torsion box and it has a similar shape to the shape of the outer perimeter or contour of the torsion box.

In alternative aspects of the present disclosure, the belt-like reinforcing element also extends around other parts of the structure, for example in the case of an HTP, the belt-like reinforcing element also extends around a leading edge and/or a trailing edge of the structure, in such a way that the leading edge and/or the trailing edge can be integrated into the structure. In this case, the shape of the belt-like reinforcing element is the similar to the outer perimeter or contour of the assembly formed by the torsion box and the leading edge and/or a trailing edge.

When the reinforcing element is made of a metallic material, this is fixed by suitable mechanical or bonding means, to the torsion box and the leading edge and/or a trailing edge, once these parts of the structure are cured.

When the belt-like reinforcing element is formed from a composite material, the reinforcing element is formed as a stack of plies of a composite material forming the belt configuration, and with the particularity that the plies of the stack are preferably arranged along the load introduction direction, transversely to an axis placed along the longitudinal direction so that the fibers are orientated in the direction of the torsional forces that the reinforcing element has to withstand, such the function of this reinforcing element is achieved.

The belt-like reinforcing element formed from a composite material, is formed during the same manufacturing process of the structure, in such a way that the reinforcing element is an integral part of the structure. For example, the reinforcing element is formed as a pre-form which is placed on the skin covers, or alternatively inserted between the cells and skin covers, and then the whole assembly is co-cured together.

In other implementations of the present disclosure, the belt-like reinforcing element is cured independently, and then co-bonded or secondarily bonded to the structure.

The present disclosure also refers to a horizontal tailplane for an aircraft having two symmetrically arranged multi-spar torsion box structures according to aspects of the present disclosure.

Some advantages of the present disclosure can be summarized as follows:

- A torsion box is reinforced against torsional deformations, with minimal manufacturing and assembly time and cost compared with prior art multi-spars concepts.
- Since the reinforcing element is placed at the outer surface of the structure, its installation is very simple, since the interior of the multi-spar torsion box does no need to be accessed. The installation of ribs or other internal structural elements inside a multi-spar torsion box is avoided.
- Since the reinforcing element is a strip, that is, a thin body, the weight of the same is optimized and the weight of the overall structure is not increased significantly.
- Other parts of the structure, like leading edge and trailing edges, can be integrated into the structure, by using the belt-like reinforcing element as support for fitting some panels or caps of the leading and/or trailing edges.

BRIEF DESCRIPTION OF THE FIGURES

Preferred aspects of the present disclosure are henceforth described with reference to the accompanying drawings, wherein:

FIGS. 1A and 1B show examples of a prior art multi-spar torsion box structure used for the construction of a HTP. FIG. 1A is a perspective view and FIG. 1B is an exploded view of an example of a prior art multi-spar torsion box structure;

FIG. 2A is a perspective view of a torsion box while FIGS. 2B-2D show top views of other examples of arrangements for the reinforcing element in accordance with an aspect of the present disclosure, the arrows "Y" indicate the direction of a load introduction to the torsion box and axis "X" indicates the longitudinal direction of the torsion box;

FIGS. 3A and 3B show cross-sectional views of a multi-cell torsion box including a reinforcing element according to an aspect of the present disclosure, wherein FIG. 3A shows the reinforcing element as a separate element fastened or bonded to the torsion box and wherein FIG. 3B shows the reinforcing element as integrated element in the manufacturing process placed between performs of covers and cells or spars in accordance with aspects of the present disclosure;

FIG. 4A shows the reinforcing element as a separate element fastened or bonded to the torsion box and extending on the leading edge as a continuous element, FIG. 4B shows it as a discontinuous element, FIGS. 4C-4F show the reinforcing element as an integrated element in the manufacturing process and extending following the leading edge, and in different locations, on the skin covers pre-forms (FIGS. 4C and 4D), and between skin covers pre-forms and cells/spars pre-forms (FIGS. 4E and 4F);

FIGS. 8A-8F show illustrations of a torsion box in accordance with another aspect of the present disclosure where the reinforcing element extends over the torsion box and both over leading and trailing edges, and the reinforcing element is constructed as an integrated element, on the skin covers pre-forms (FIGS. 8A-8D), and between skin covers pre-forms and cells/spars pre-forms (FIGS. 8E and 8F);

DETAILED DESCRIPTION OF THE PRESENT DISCLOSURE

Figure 1B:
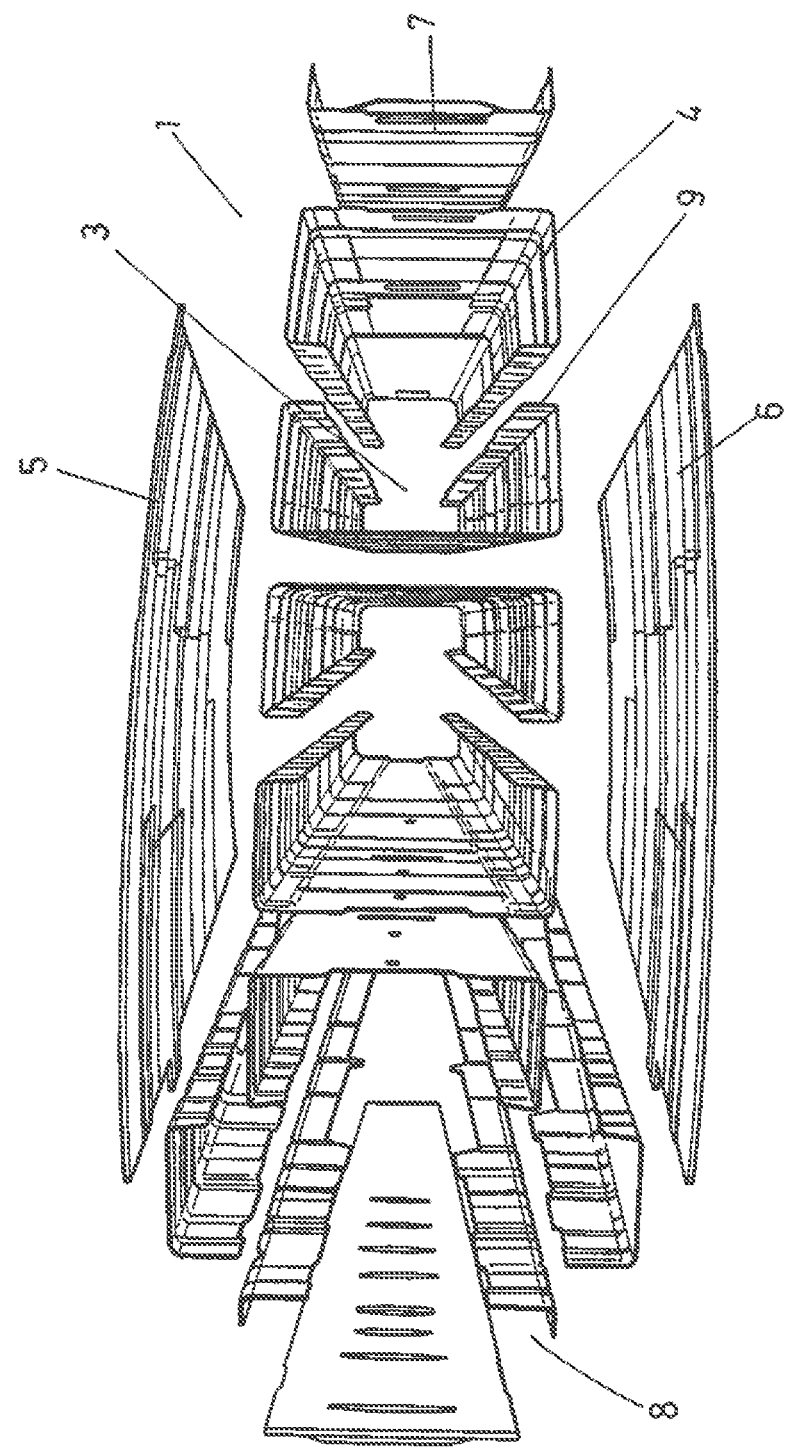

FIGS. 3A to 8F show a multi-cell structure (10) of a torsion box (1), wherein the multi-cell structure is obtained from a composite material and have three cells (11A,11B, 11C) extending in a longitudinal direction of the torsion box, and defining upper and lower surfaces (18,19). The cells are longitudinal channels defined by several stringers placed and fixed (co-cured) in a consecutive manner, and grouped in pairs symmetrically arranged with respect to each other such as each pair define a cell. For example, in FIGS. 3A to 8F, the cell (11A) is defined by a first pair of spars (12A,13A), cell (11B) is defined by a second pair of spars (12B,13B) and so on.

Each spar (12A, 13A, 12B, 13B, 12C, 13C) has a C-shaped cross-sectional shape, having a web (14), upper and lower flanges (15', 15") and folded edges (16',16") at the free ends of the spar. As shown in the Figures, the folded edges of each pair of adjacent symmetrical spars, for example 12A and 13A, overlap and are in contact with each other and together form stringers (17) of the structure (10), see FIG. 3B.

The torsion box (1) structure also comprises upper and lower skin covers (5,6) also of composite material, which are respectively joined to the upper and lower surfaces (18,19) of the multi-cell structure (10).

According to the present disclosure, the multi-cell structure (10) is provided with at least one belt-like (or ring-like) reinforcing element (20) which has the form of a belt or strip, that is, a thin and narrow body with respect to the overall size of the structure. This reinforcing element (20) is a single body configured as a closed loop (with no ends), as shown for example in one aspect of FIGS. 3B, 4E, 6F and 8E. However, in alternative aspects the reinforcing element (29) is formed by two or more individual segments, for example in the aspects of FIGS. 3A,4B,4D, 6A, 6B,6C, 6D, 7B, 7D,8B, 8D.

Still, in other alternative aspects, the reinforcing element is a single body configured as an open loop (with two ends), as shown for example in the aspects of FIGS. 4A,4C, 4F, 6E, 7A, 7C, 8A, 8C, 8F. This configuration of the reinforcing element with a gap at a front part and provides the advantage that the assembly of the inboard and outboard leading edges is optimized, and an auxiliary attachment rib can be fitted if necessary.

Nevertheless, in all these three alternatives, either with the reinforcing element (20) formed as a single body or as several individual segments, the reinforcing element extends following parts of the outer perimeter of the torsion box or following the entire perimeter of the same, and it is transversely arranged with respect to an axis (X) placed or oriented along the longitudinal direction as shown in FIGS. 2A-2D. This means that the longitudinal axis of the reinforcing element is transversal to the longitudinal direction of the X axis.

The reinforcing element (20) is made of a metallic or a composite material like CFRP. Some parts of the reinforcing element (20) are fixed to the upper and lower surfaces (18,19) of the multi-cell structure, which can be carried out by fastening means in the case of a metallic reinforcing, or by a co-curing, co-bonding or secondary bonding process in the case of a composite reinforcing.

Preferably, the reinforcing element (20) is a stack of plies (or a laminate) of composite material, wherein each ply has unidirectional orientated fibers. According to the present disclosure, the majority of the plies of the reinforcing element are substantially arranged in the same direction as a load introduction direction (Y), and transverse to the longitudinal axis (X). This feature is shown in more detail in FIGS. 2B to 2D, wherein it can be observed that the reinforcing element (20) is oriented in the same direction as the load introduction direction (Y) which appears for example at a fitting or pivot point (24) and which depends on the design of each particular torsion box.

Figure 3A:
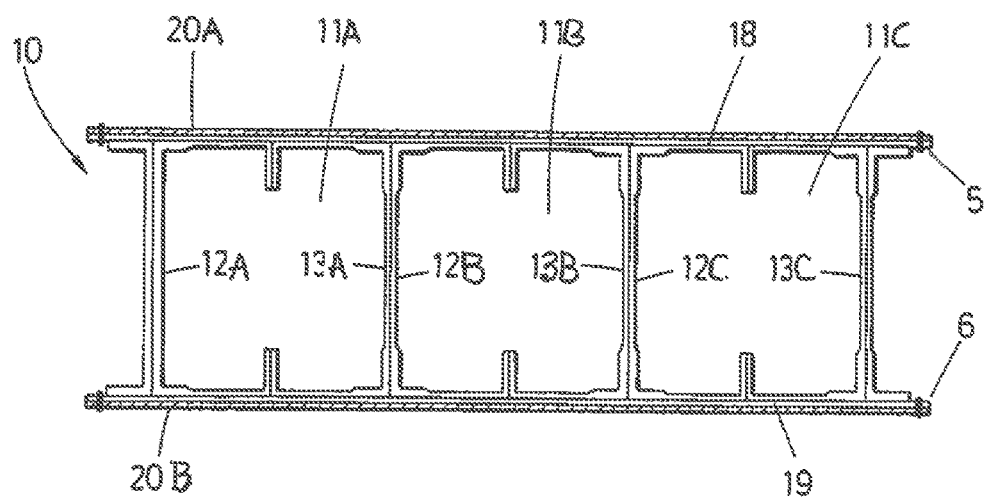
Figure 3B:
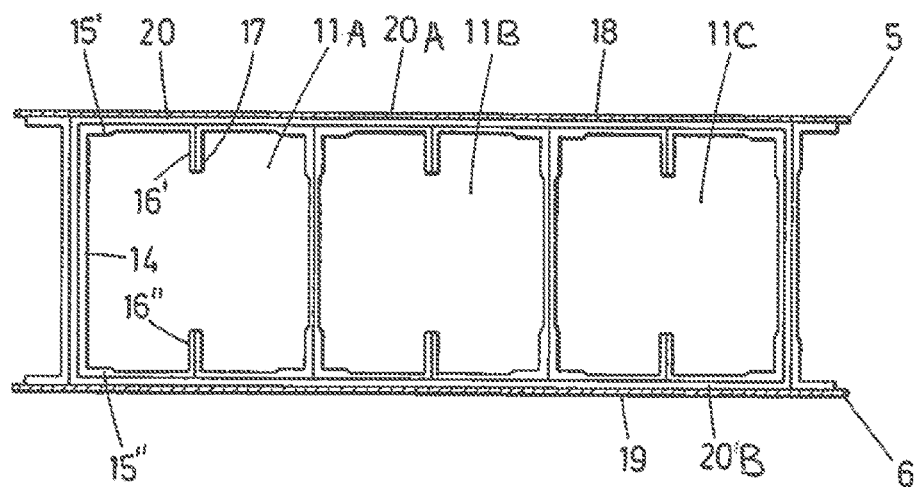
Figure 4A:
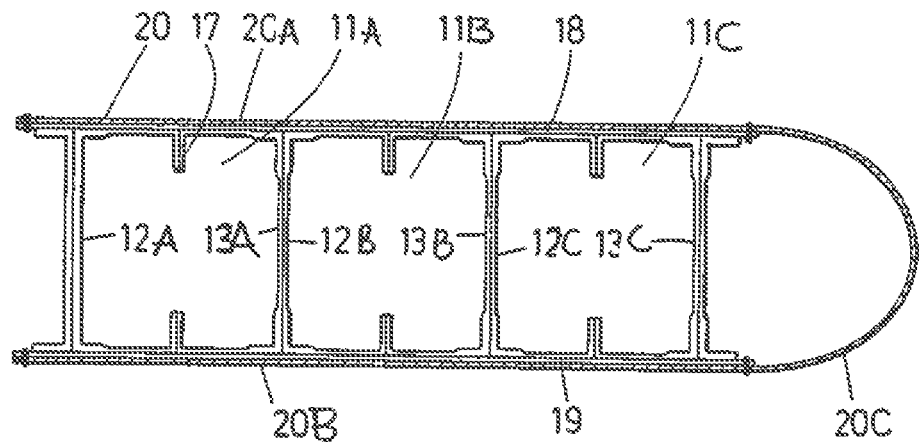
FIGS. 4A-4F show similar representation to FIGS. 3A and 3B in accordance with another aspect of the present disclosure.
Figure 4B:
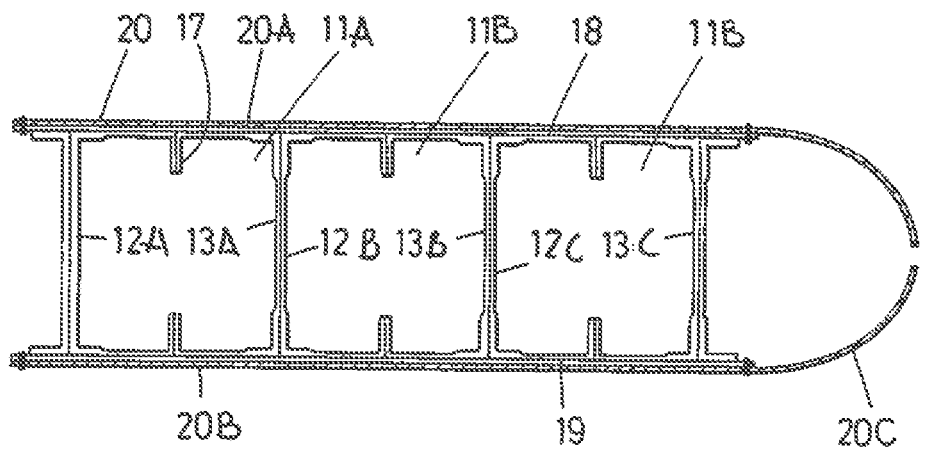
Figure 4C:
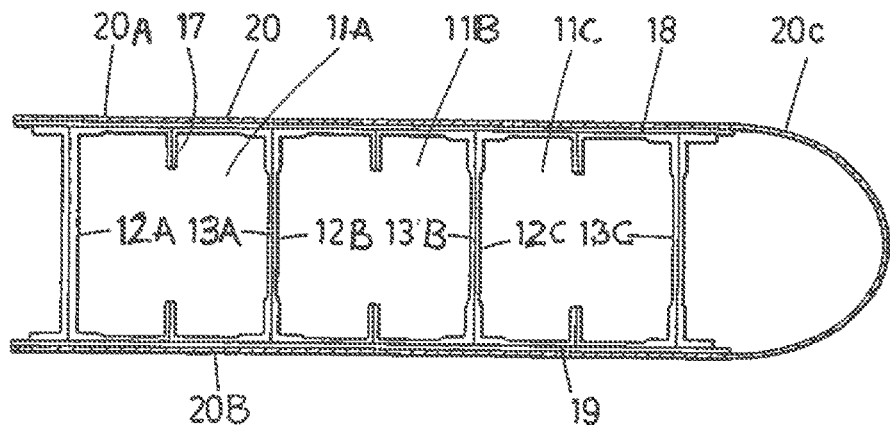
Figure 4D:
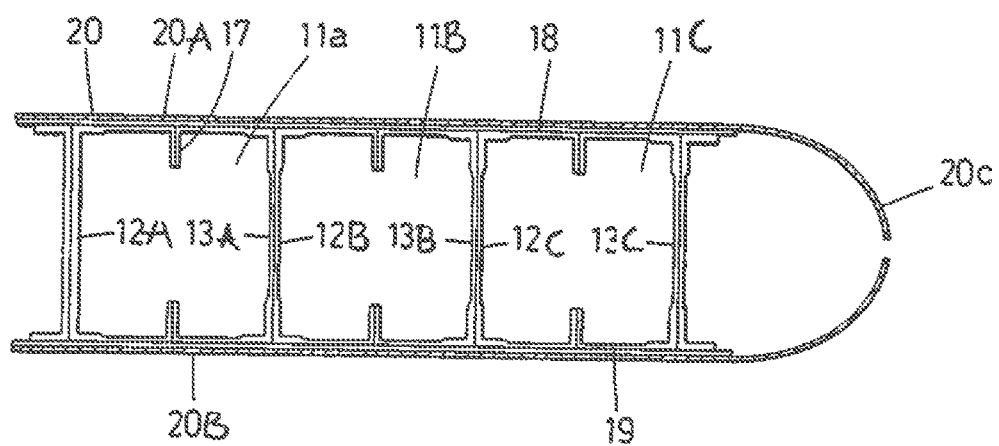
Figure 4E:
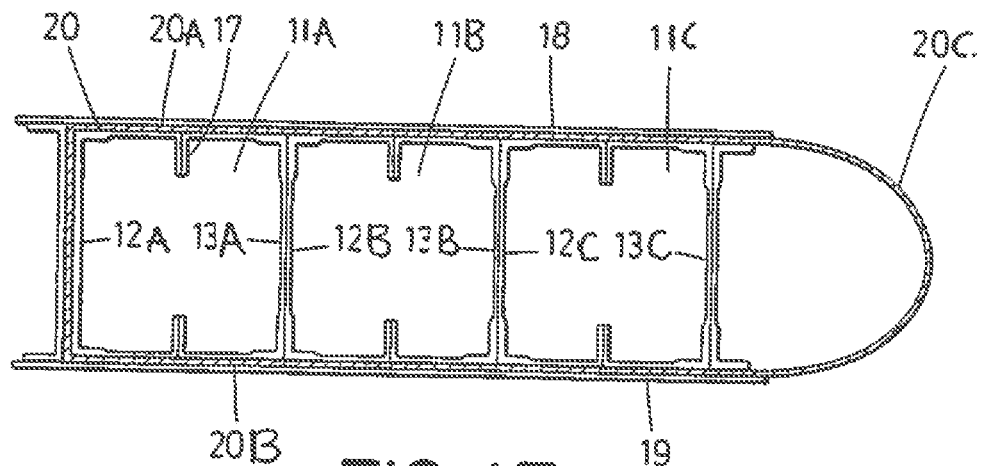
Figure 4F:
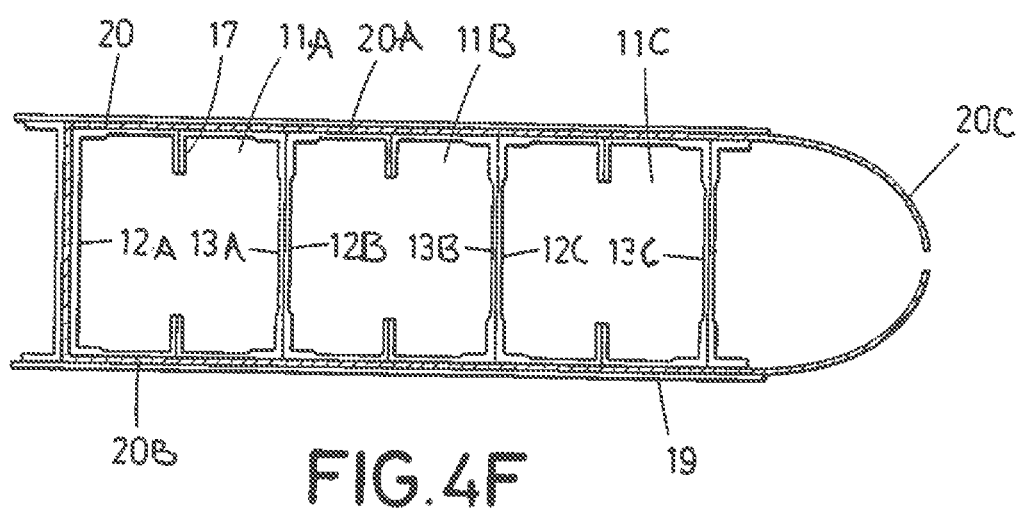
Figure 6A:
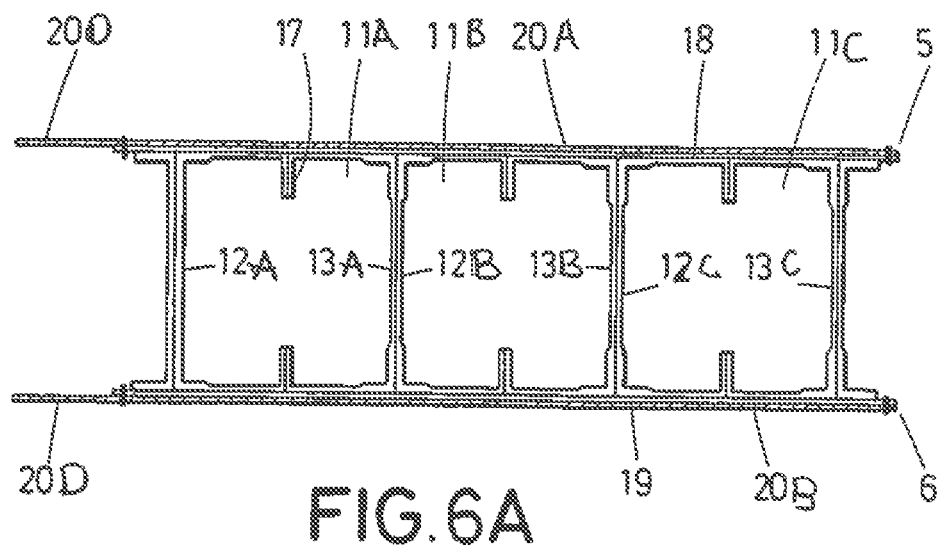
FIGS. 6A-6F show similar representations to FIGS. 4A-4F in accordance with the present disclosure, wherein the reinforcing element extends over the trailing edge instead of the leading edge, in FIGS. 6A and 6B, the reinforcing element is a separate element fastened or bonded to the torsion box, and in FIGS. 6C-6F, the reinforcing element is an integrated element obtained in the same manufacturing process, on the skin covers pre-forms (FIGS. 6C and 6D), and between skin covers pre-forms and cells/spars pre-forms (FIGS. 6E and 6F)
Figure 6B:
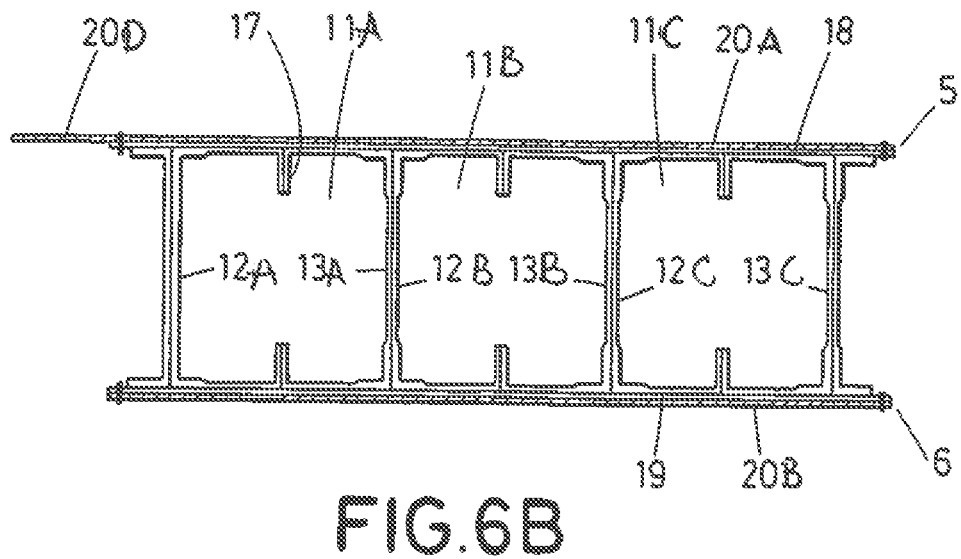
Figure 6C:
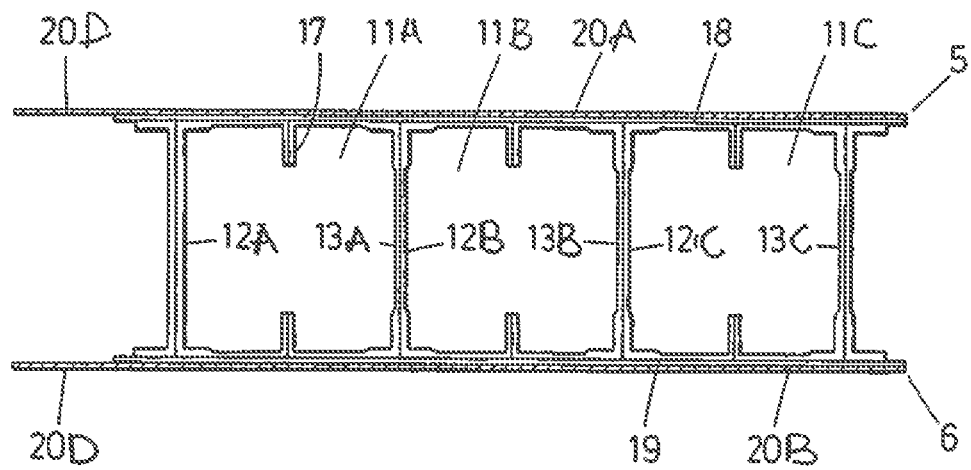
Figure 6D:
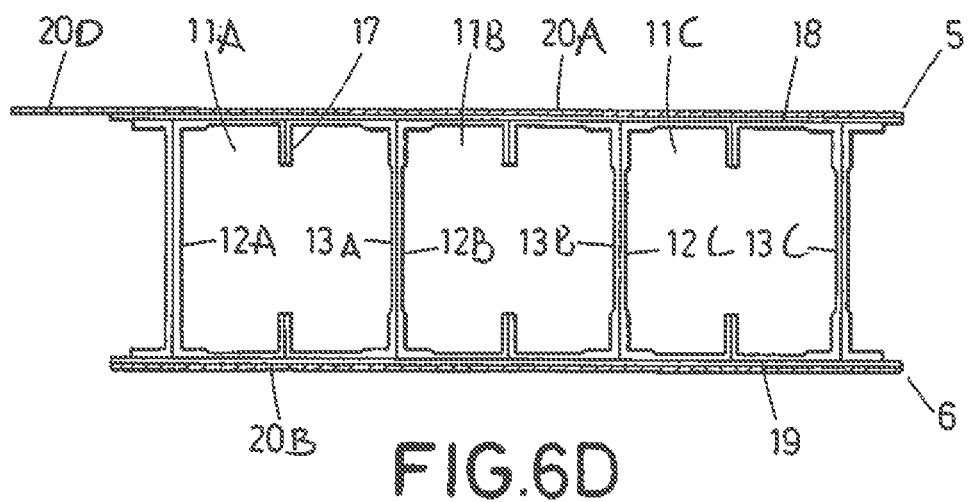
Figure 6E:
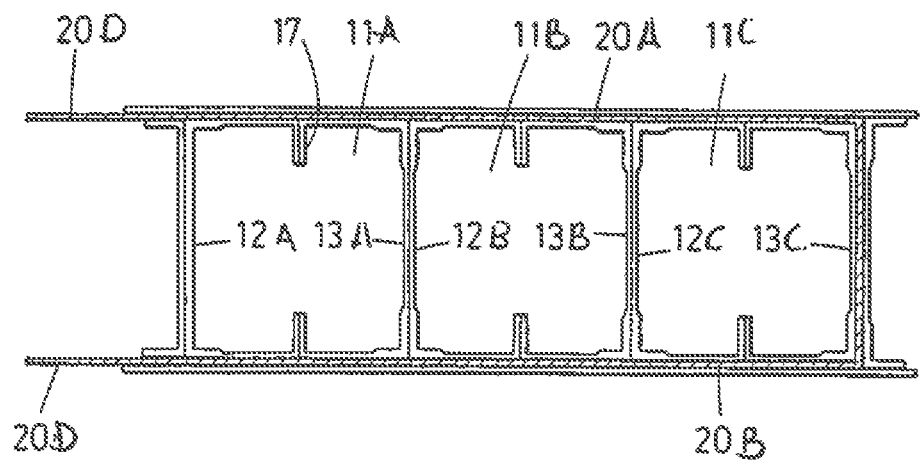
Figure 6F:
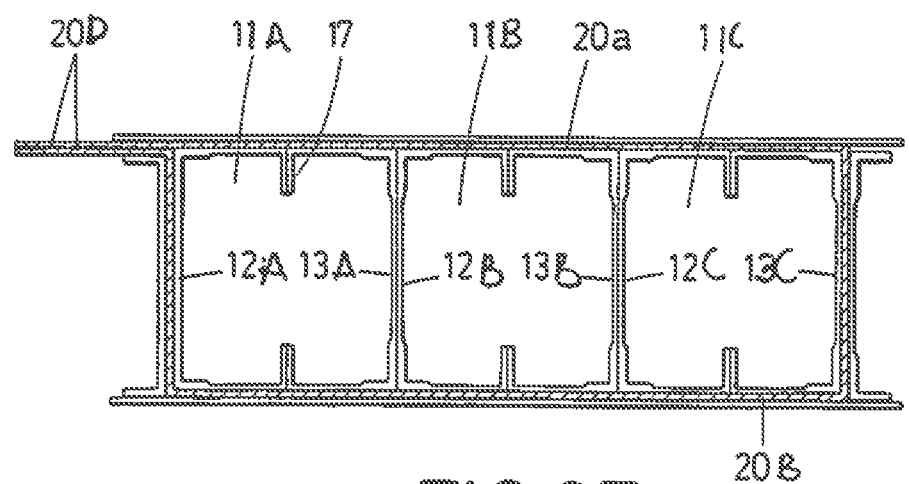
Figure 7A:
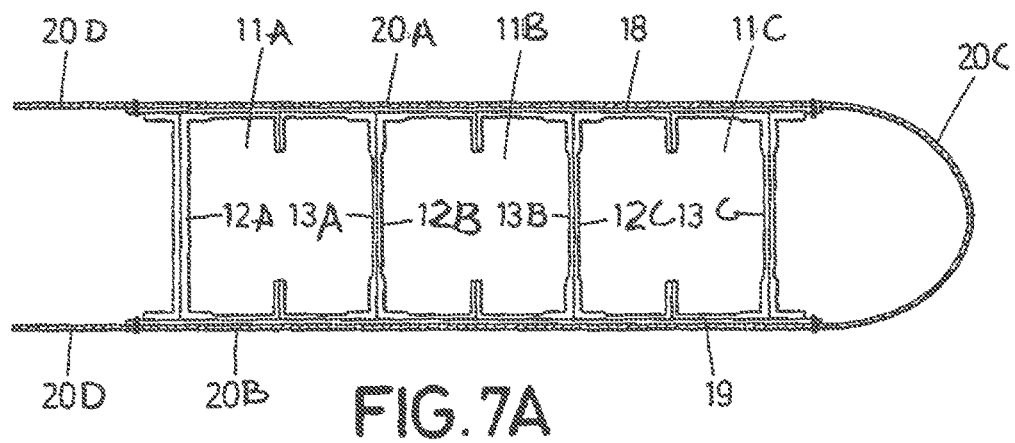
FIGS. 7A-7D show illustrations of a torsion box in accordance with another aspect of the present disclosure where the reinforcing element extends over the torsion box and both over leading and trailing edges, and the reinforcing element is constructed as a separate element fastened or bonded to the torsion box in accordance with an aspect of the present disclosure.
Figure 7B:
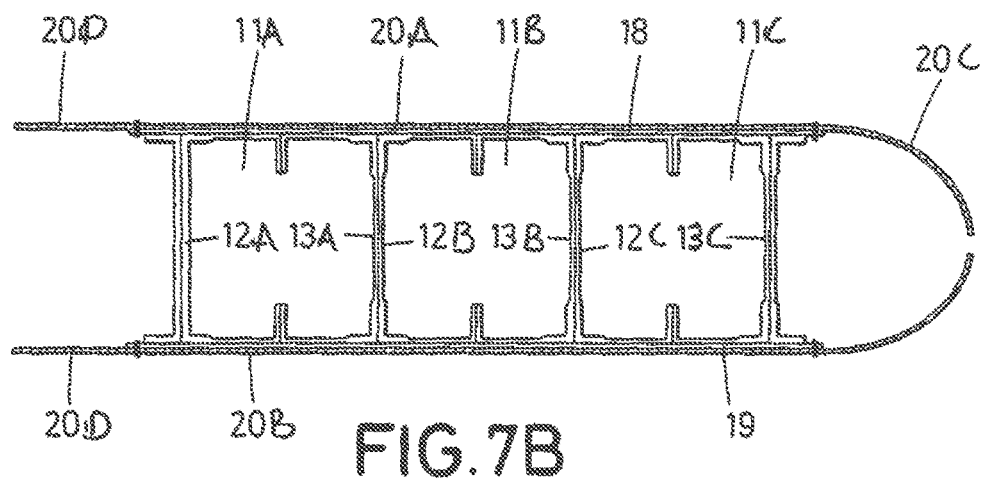
Figure 7C:
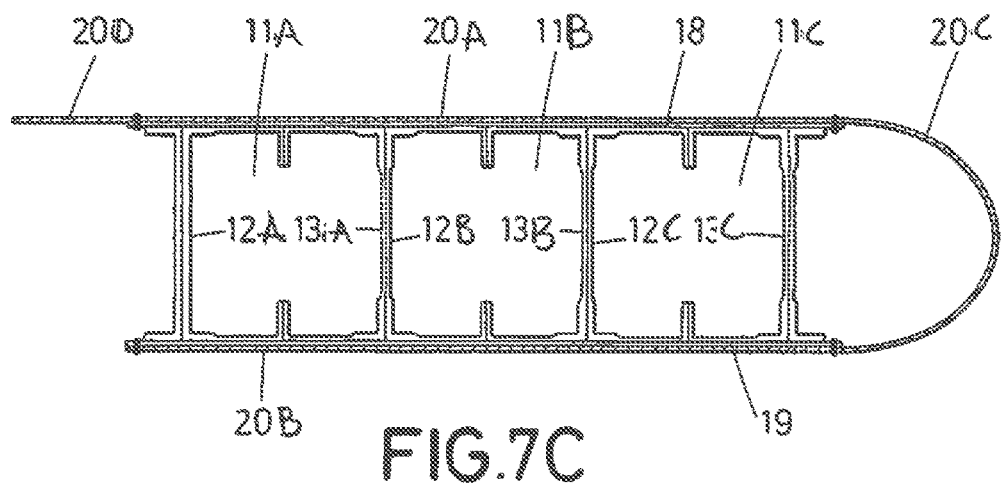
Figure 7D:
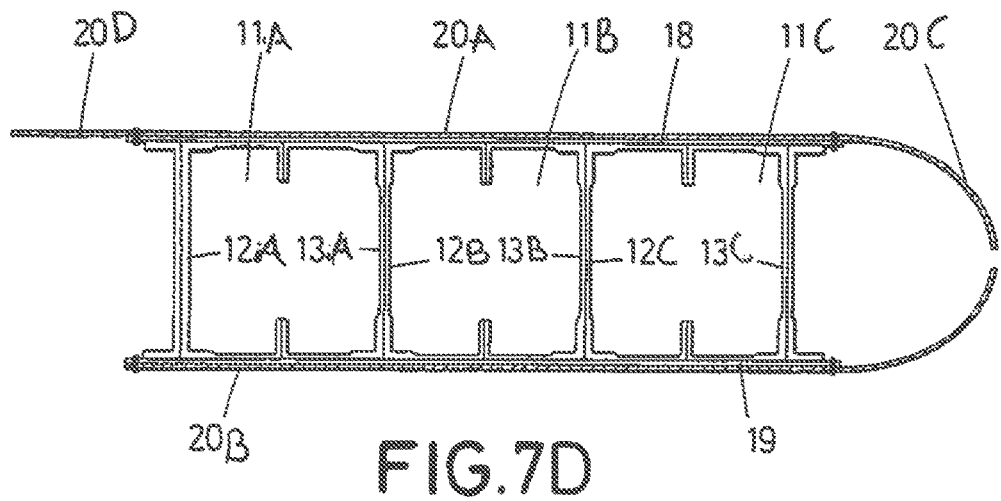
Figure 8A:
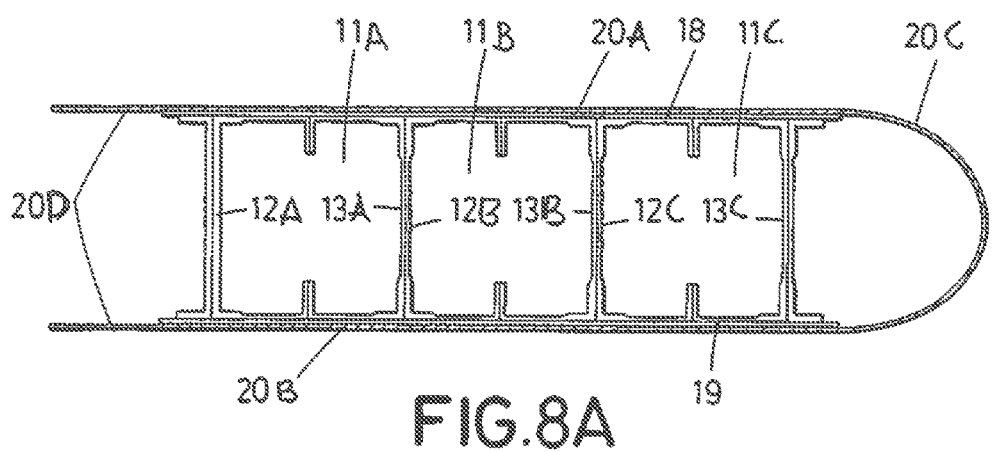
Figure 8B:
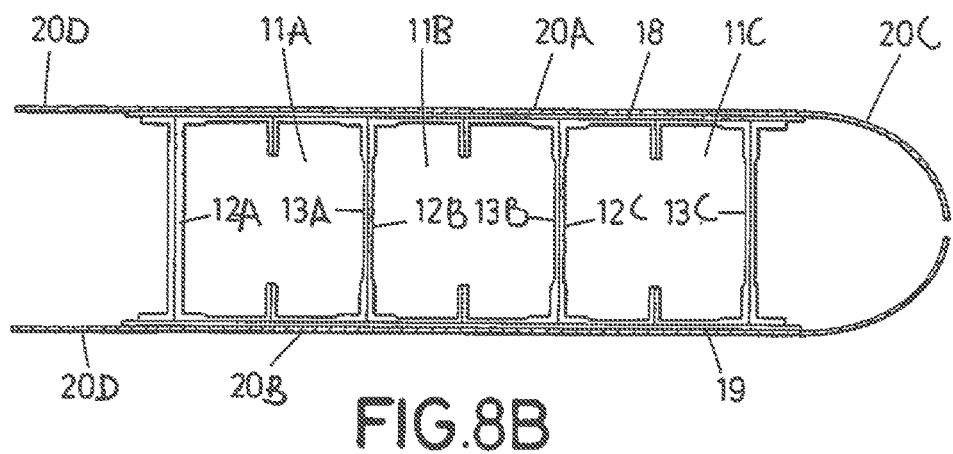
Figure 8E:
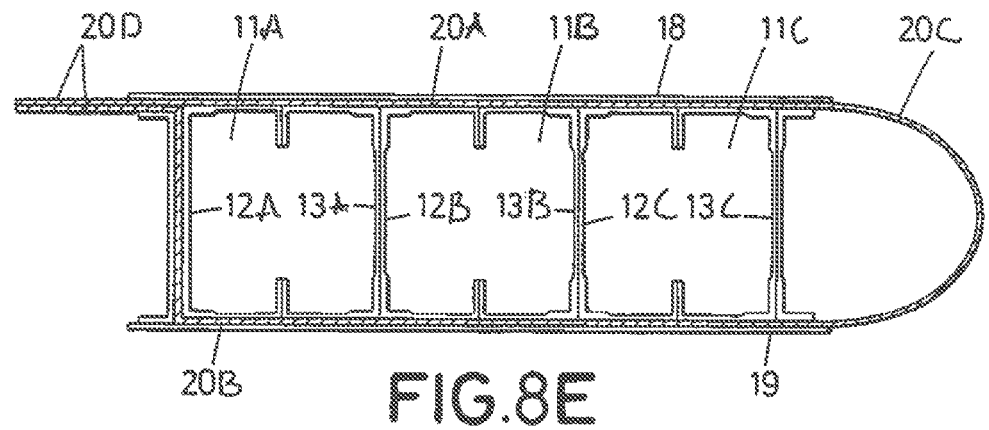
Figure 8F:
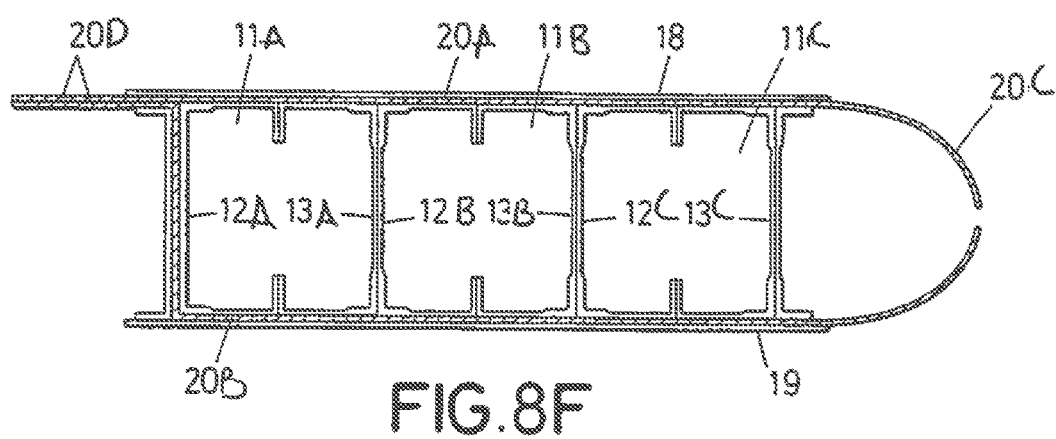
Figure 9A:
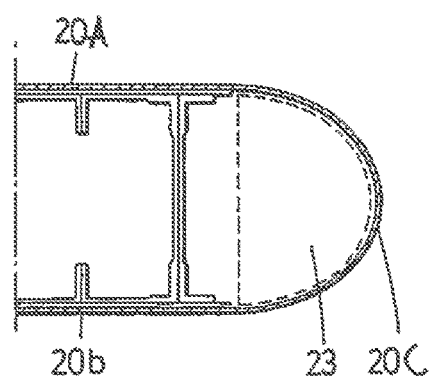
FIGS. 9A and 9B show an example of an auxiliary tooling used for manufacturing the reinforcing element extending around the leading edge in accordance with an aspect of the present disclosure.
Figure 9B:
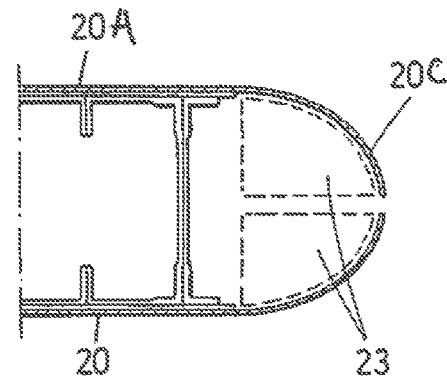

In some aspects, for example in FIGS. 3B and 6F, the reinforcing element (20) extends only around the multi-cell structure (10), and then it has a "rectangular" configuration, whereas in other aspects the reinforcing element (20) is formed by two segments (20A,20B) respectively joined to upper and lower surfaces (18,19), as is the case from examples shown in FIGS. 3A, 4B, 6A,6B,6C, 6D.

Figure 2A:
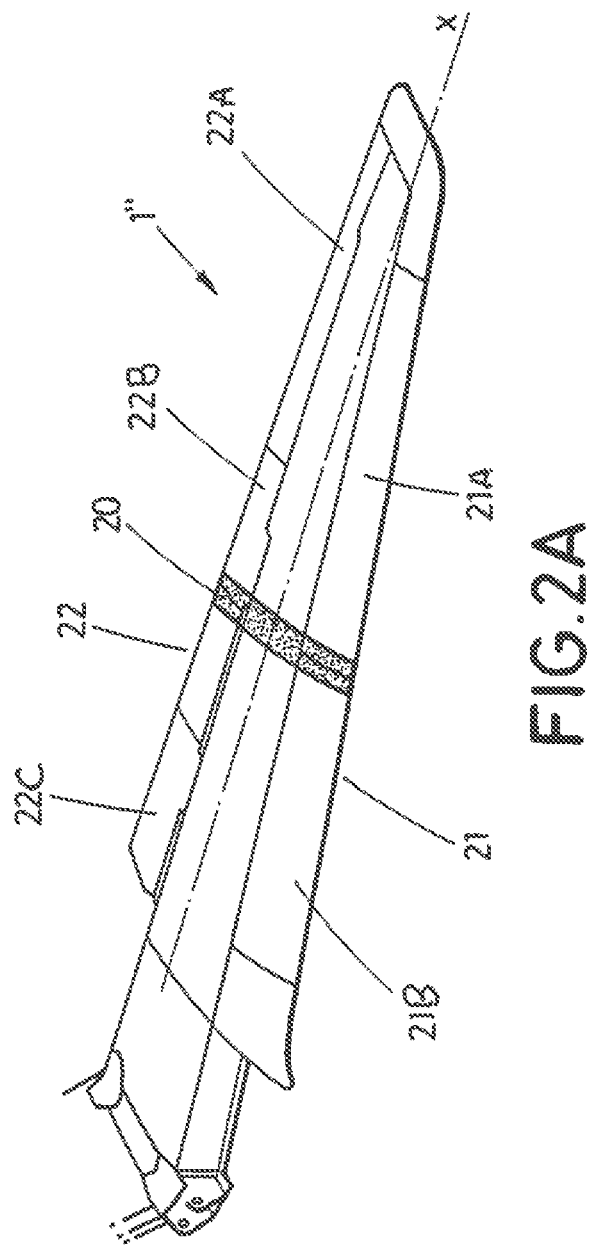
FIGS. 2A-2D show various views of a torsion box including a reinforcing element according to an aspect of the present disclosure.
Figure 2B:
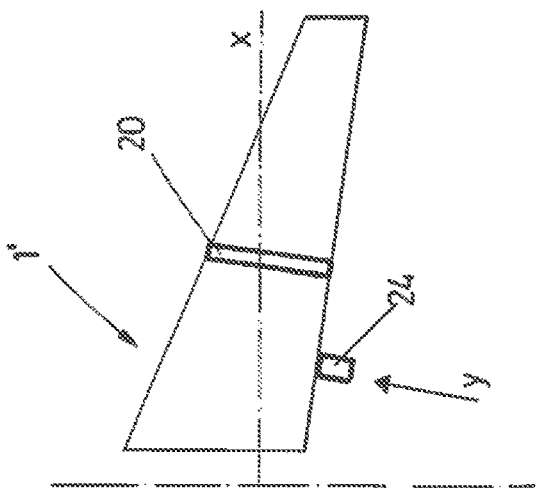
Figure 2C:
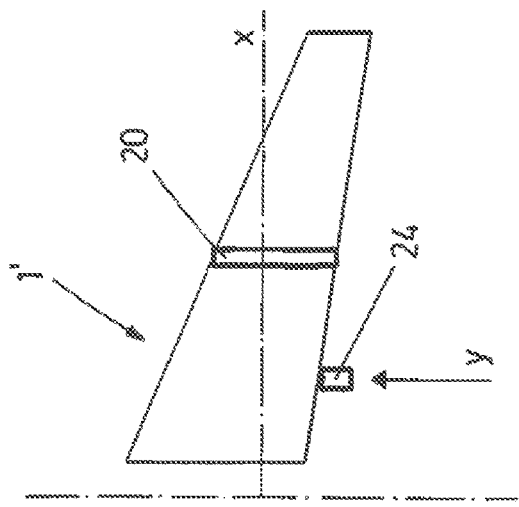
Figure 2D:
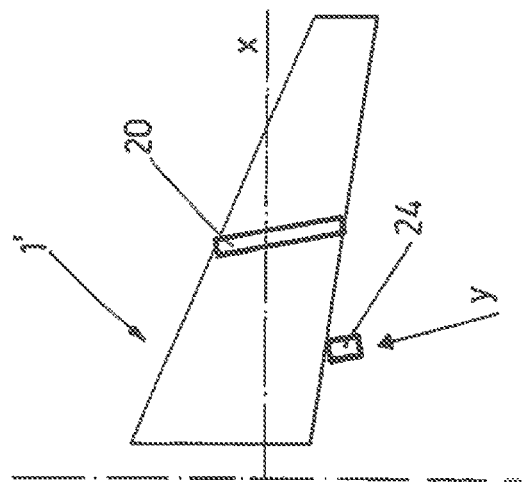

A torsion box structure commonly has a leading edge profile (21) fitted to a front spar of the torsion box, and a trailing edge profile (22) fitted to a rear spar of the torsion box, as shown in FIG. 2A. The present disclosure provides that a part of the reinforcing element (20) also extends around the leading edge (21) and/or the trailing edge (22). In this way and by properly dimensioning the reinforcing element (20), this can be used as a support or fitting for receiving caps or panels of the leading edge (21) and/or trailing edge (22).

Figure 5:
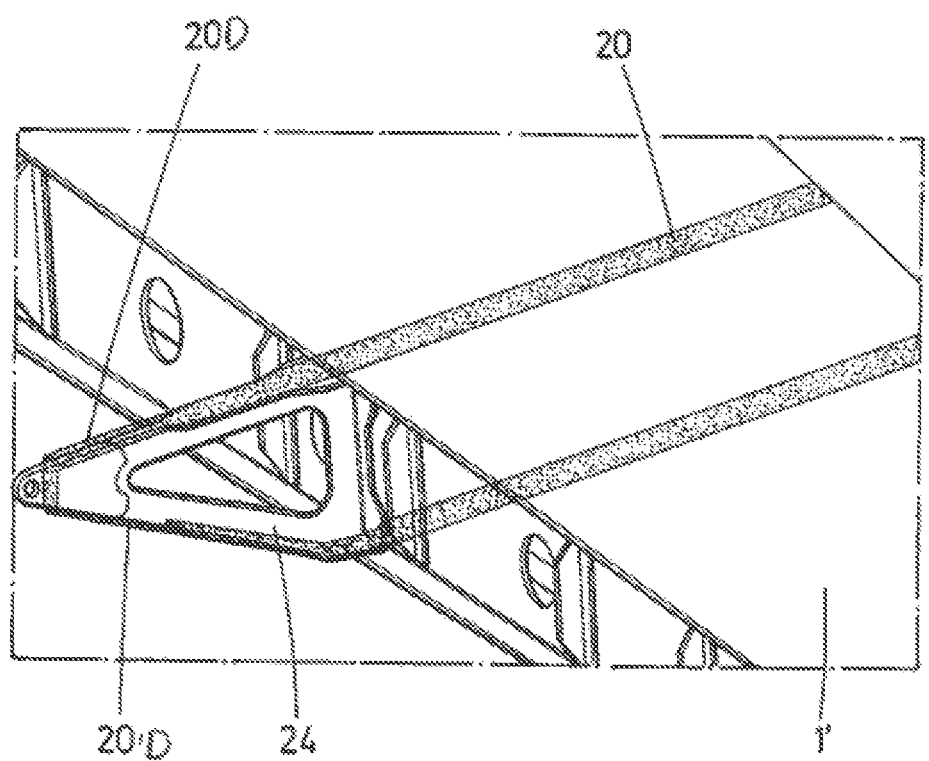
FIG. 5 shows a partial perspective view of a torsion box with a reinforcing element extending on outer surfaces of a fitting for a trailing edge in accordance with an aspect of the present disclosure.

When the reinforcing element (20) extends around the trailing edge (22), this can be done integrating only the upper panels (FIGS. 6B,6D) or upper and lower panels of the trailing edge (22) (FIG. 6A,6C). Due to maintenance requirements, the lower panels of the trailing edges (22) must be removable, therefore when the reinforcing element (20) extends on both upper and lower panels of the trailing edge 22, these rear parts of the reinforcing element 20 are fitted on the Trailing Edge Ribs (TER) or Bearing Edge Ribs (BER) (24) as shown in FIG. 5.

This can be observed for example in the aspects of FIGS. 4A-4F, 7A-7D, 8A-8F, wherein the reinforcing element (20) has a front part (20C) extending around the perimeter of the leading edge 21 of the structure. Similarly, in other aspects the reinforcing element (20) has a rear part (20d) extending towards the trailing edge 22 of the structure (see FIGS. 6A-6F). Still, in other aspects, the reinforcing element (20) has a front part (20C) extending on the perimeter of the leading edge 21, and a rear part (20D) extending towards the trailing edge 22 of the structure (see FIGS. 7A-7D, 8A-8F).

For curing these front and rear parts (20C,20D) of the reinforcing element (20), auxiliary tooling (23) are used having surfaces with the desired shape for those front and rear parts, which are subsequently removed after the curing process.

Additionally, the reinforcing can be placed anywhere in the structure, for example at least one part of the reinforcing element (20) is placed between the multi-cell structure (10) and a skin cover (5,6) (see FIGS. 3B,4E, 4F, 6E, 6F, 8E,8F). Alternatively, at least one part of the reinforcing element (20) is placed on a skin cover (5,6) which is in turn placed on the spars flanges.

For the integration of the reinforcing element 20, a groove (not shown) is formed on one of the surfaces of the skin covers and/or the spars flanges depending on each particular aspects, in such a way that the reinforcing element 20 is received within the groove. The groove is dimensioned such as the reinforcing element 20 is flush with that surface, and it does not protrude from the structure.

As shown for example in FIGS. 3B, 4E,4F, 6E, 6F, 8E, and 8F, one or more parts of the reinforcing element (20) are placed between spars webs.

Typically, the leading edge and the trailing edge comprise respectively two or more sections (21A,21B), (22A,22B, 22C) longitudinally arranged in the structure. Preferably, the reinforcing element (20) is placed in correspondence with the separation line between adjacent leading edge and the trailing edge sections, as shown in FIG. 2A, in order to allow the attachment of these sections to the reinforcing element, which in this case also serves as a support for those sections.

The reinforcing element (20) thickness (t) and width (b) are calculated for each particular application to reduce the magnitude of deformations of the torsion box. A simplified approach to approximate the sizing of the reinforcing element (20) is explained hereafter.

Figure 10:
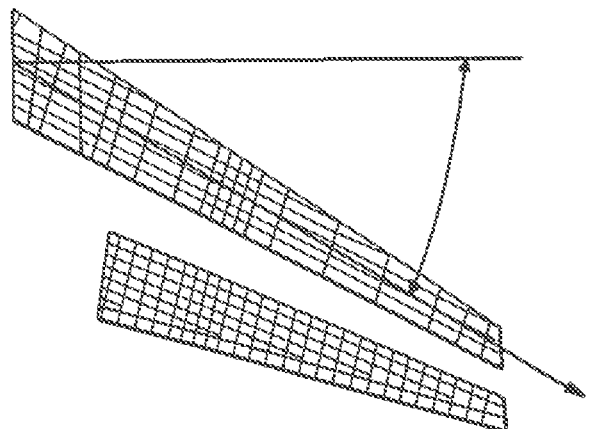
FIG. 10 shows the torsion of the HTP box along the longitudinal axis in accordance with an aspect of the present disclosure.

The torsion of the HTP box along the longitudinal axis is defined by the following equation at each transversal section, and it is illustrated in FIG. 10:

$$\theta = \frac{T}{G \cdot I_t}$$

where,
θ=torsion angle
T=resultant torsion moment
G·$I_t$=equivalent torsion rigidity
(G=constant, material shear modulus; $I_t$=equivalent torsion inertia moment)

Figure 11:
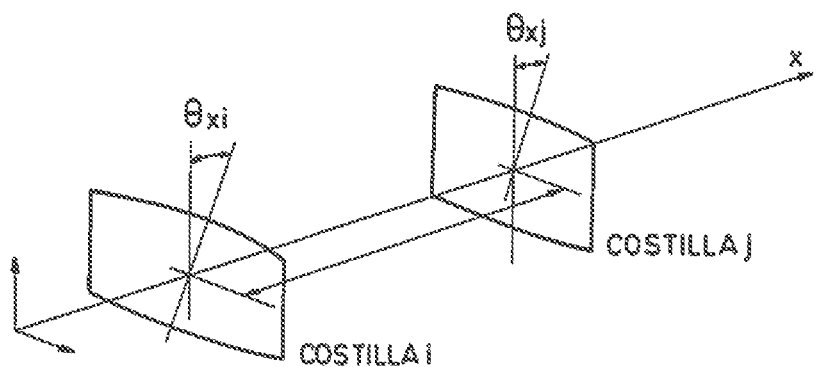
FIG. 11 shows the torsion inertia moment of the reinforcing element in accordance with an aspect of the present disclosure.

The reinforcing element (20) shall provide a value of rigidity similar to the one provided by a rib in that position; therefore, the torsion inertia moment (FIG. 11) shall be similar.

$$I_{t\_reinforcing\ element} \sim I_{t\_fib}$$

Figure 12:
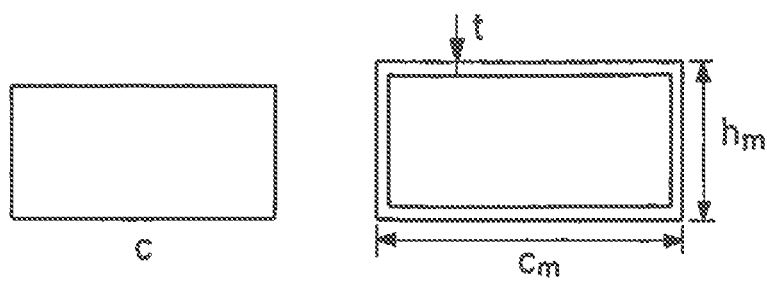
FIG. 12 shows a simplified geometry of the reinforcing element and a rib in accordance with an aspect of the present disclosure.

Considering a simplified rectangular geometry of the reinforcing element and a rib, the reinforcing element thickness (t) can be obtained approximately, by equaling the inertia moments of the sections (see FIG. 12).

$$I_{t\_rib} = \beta \ldots h^3 \qquad I_{t\_ring} = \frac{4 \cdot c_m^2 \cdot h_m^2}{2 \cdot \frac{c_m}{t} + 2 \cdot \frac{h_m}{t}}$$

Where:
β is a constant, function of the rectangle dimensions $$\beta = \beta\left(\frac{v}{h}\right)$$

with values nom β(1)=0.141 to β(∞)=0.33
c is the chord of the rib
$C_m$: is the size of a side of the loop formed by the reinforcing element
$h_m$: is the size of another side of the loop formed by the reinforcing element On the other hand, the width of the reinforcing element (b) will be similar to the rib flanges width.

$$b_{min} \sim b_{rib}$$

Other preferred aspects of the present disclosure are described in the appended dependent claims and the multiple combinations thereof.

What is claimed:

1. A multi-spar torsion box structure, comprising:
a plurality of spars, including at least a front spar and a rear spar, of a composite material arranged to form a multi-cell structure with at least two cells extending in a longitudinal direction of said torsion box, said multi-cell structure having upper and lower surfaces,
upper and lower skin covers of a composite material are joined to said upper and lower surfaces, respectively, of said multi-cell structure,
wherein said multi-spar torsion box structure further includes at least one belt-like reinforcing element, said reinforcing element received in a groove and said belt-like reinforcing element is configured as a closed loop and extends completely around an outer perimeter of said torsion box, and fixed to said upper and lower surfaces of said multi-cell structure, and wherein at least a part of said belt-like reinforcing element is transversely arranged with respect to an axis (X) oriented in said longitudinal direction of said torsion box, and wherein said belt-like reinforcing element is made of a composite material, and wherein a width and a thickness of said reinforcing element is dimensioned to withstand torsional loads and to prevent deformations of said torsion box.

2. The multi-spar torsion box structure of claim 1, wherein said belt-like reinforcing element is arranged in a load introduction direction.

3. The multi-spar torsion box structure of claim 1, wherein said belt-like reinforcing element is a stack of plies of a composite material having unidirectional orientated fibers, and wherein a majority of said plies of said reinforcing element are transversely arranged with respect to said axis (X) which is oriented in said longitudinal direction of said torsion box.

4. The multi-spar torsion box structure of claim 3, wherein said belt-like reinforcing element is co-cured, co-bonded or secondarily bonded with a component of said structure.

5. The multi-spar torsion box structure of claim 1, further comprising:
a leading edge fitted to said front spar of said torsion box, and
wherein said belt-like reinforcing element also extends around a perimeter of said leading edge.

6. The multi-spar torsion box structure of claim 5, further comprising:
a trailing edge fitted to said rear spar of said torsion box, and
wherein said belt-like reinforcing element also extends around a perimeter of said trailing edge.

7. The multi-spar torsion box structure of claim 6 wherein both of said leading edge and said trailing edge respectively each comprise at least two adjacent sections arranged longitudinally in said structure, and wherein said belt-like reinforcing element is placed in a position corresponding to separation lines between adjacent leading edge and trailing edge sections.

8. The multi-spar torsion box structure of claim 7, wherein a part of said belt-like reinforcing element extends around said leading edge of said structure.

9. The multi-spar torsion box structure of claim 7, wherein a part of said belt-like reinforcing element extends around said trailing edge of said structure.

10. The multi-spar torsion box structure of claim 1, wherein at least one part of said belt-like reinforcing element is placed between said multi-cell structure and at least one of said skin covers.

11. The multi-spar torsion box structure of claim 10, wherein another part of said belt-like reinforcing element is placed between two adjacent spars of said torsion box.

12. The multi-spar torsion box structure of claim 1, wherein at least one part of said belt-like reinforcing element is placed on at least one of said skin covers.

13. The multi-spar torsion box structure of claim 1, wherein said belt-like reinforcing element is formed from two or more individual segments.

14. A horizontal tailplane for an aircraft, comprising:
two symmetrically arranged multi-spar torsion box structures, each having a plurality of spars of a composite material arranged to form a multi-cell structure with at least two cells extending longitudinally along said torsion box, said multi-cell structure having both upper and lower surfaces and upper and lower skin covers of a composite material joined to said upper and lower surfaces, respectively, of said multi-cell structure, wherein each of said two symmetrically arranged multi-spar torsion box structures further include at least one belt-like reinforcing element, said reinforcing element received in a groove and said belt-like reinforcing element is configured as a closed loop and extends completely around an outer perimeter of said torsion box, and fixed to said upper and lower surfaces of said multi-cell structure, and wherein at least a part of said belt-like reinforcing element is transversely arranged with respect to an axis (X) oriented in a longitudinal direction of said torsion box, and wherein said belt-like reinforcing element is made of a composite material, and wherein a width and a thickness of said reinforcing element are dimensioned to withstand torsional loads and to prevent deformations of said torsion box.

* * * * *